(12) United States Patent
Beraud et al.

(10) Patent No.: US 9,682,515 B2
(45) Date of Patent: Jun. 20, 2017

(54) INTERMEDIATE MATERIAL WITH CONSTANT WIDTH FOR THE DIRECT PROCESS PRODUCTION OF COMPOSITE COMPONENTS

(75) Inventors: Jean-Marc Beraud, Rives (FR); Alain Bruyere, Les Avenieres (FR); Jean-Florent Lamethe, Chambery (FR); Jacques Ducarre, La Tour du Pin (FR)

(73) Assignee: Hexcel Reinforcements, Dagneux (FR)

( * ) Notice: Subject to any disclaimer, the term of this patent is extended or adjusted under 35 U.S.C. 154(b) by 908 days.

(21) Appl. No.: 13/130,714

(22) PCT Filed: Nov. 23, 2009

(86) PCT No.: PCT/FR2009/052265
§ 371 (c)(1),
(2), (4) Date: Sep. 29, 2011

(87) PCT Pub. No.: WO2010/061114
PCT Pub. Date: Jun. 3, 2010

(65) Prior Publication Data
US 2012/0015135 A1   Jan. 19, 2012

(30) Foreign Application Priority Data
Nov. 28, 2008 (FR) .................................... 08 58096

(51) Int. Cl.
*B32B 5/02* (2006.01)
*B32B 3/02* (2006.01)
(Continued)

(52) U.S. Cl.
CPC ............ *B29C 70/086* (2013.01); *B29B 15/12* (2013.01); *B29C 70/14* (2013.01); *B29C 70/20* (2013.01);
(Continued)

(58) Field of Classification Search
CPC . D04H 3/00; B32B 5/26; D03D 19/00; B29B 5/12; B29C 70/545; B29C 70/20;
(Continued)

(56) References Cited

U.S. PATENT DOCUMENTS 3,673,058 A * 6/1972 Jackson et al. ................ 428/118
5,063,014 A * 11/1991 Cakmakci ............. B29C 31/045
264/151
(Continued)

FOREIGN PATENT DOCUMENTS

EP        0554950 A    8/1993
EP   WO 2008/155504   * 5/2009
(Continued)

*Primary Examiner* — Jennifer Chriss
*Assistant Examiner* — Camie Thompson
(74) *Attorney, Agent, or Firm* — W. Mark Bielawski; David J. Oldenkamp (57) ABSTRACT

The invention concerns a process for preparing a ribbon of reinforcement strands or filaments associated on each of its faces with a polymeric binder, said ribbon having a given width substantially constant over its entire length, in which the strands or filaments extend in a direction parallel to the length of the ribbon, wherein it comprises the following steps:
  a) adjustment of the ribbon width to the desired width thanks to a dimensioning device,
  b) association of the ribbon on each of its faces with a polymeric binder allowing the assurance of a homogenous cohesion of the ribbon, such that the total weight of the binder does not exceed 25% of the total weight of the obtained ribbon,
as well as the ribbons obtainable by such a process.

20 Claims, 8 Drawing Sheets

(51) Int. Cl.
*B32B 27/04* (2006.01)
*B32B 7/04* (2006.01)
*B29C 70/08* (2006.01)
*B29C 70/14* (2006.01)
*B29C 70/20* (2006.01)
*B29C 70/50* (2006.01)
*B29C 70/54* (2006.01)
*B29B 15/12* (2006.01)
*B29K 105/08* (2006.01)
*B29K 105/00* (2006.01)

(52) U.S. Cl.
CPC .......... *B29C 70/506* (2013.01); *B29C 70/545* (2013.01); *B29K 2105/0854* (2013.01); *B29K 2105/251* (2013.01); *Y10T 428/23* (2015.01); *Y10T 428/237* (2015.01); *Y10T 428/249942* (2015.04); *Y10T 442/60* (2015.04)

(58) Field of Classification Search
CPC .......... B29C 70/086; B29K 2105/0854; Y10T 428/23; Y10T 428/249942
USPC .......... 428/298.1, 68, 74; 442/327; 427/209
See application file for complete search history.

(56) References Cited

U.S. PATENT DOCUMENTS

| | | | |
|---|---|---|---|
| 5,432,010 A | 7/1995 | Ko et al. | |
| 6,096,669 A | 8/2000 | Colegrove et al. | |
| 6,503,856 B1* | 1/2003 | Broadway et al. | ........... 442/366 |
| 2005/0048280 A1 | 3/2005 | Stamper | |
| 2010/0173143 A1* | 7/2010 | Beraud et al. | ............. 428/299.4 |

FOREIGN PATENT DOCUMENTS

| | | |
|---|---|---|
| EP | 1473132 B1 | 8/2010 |
| FR | 2600585 A | 12/1987 |
| WO | 92/20521 | 11/1992 |
| WO | 00/38904 | 7/2000 |
| WO | 2008/062818 A | 5/2008 |

\* cited by examiner

INTERMEDIATE MATERIAL WITH CONSTANT WIDTH FOR THE DIRECT PROCESS PRODUCTION OF COMPOSITE COMPONENTS

The invention concerns the technical field of reinforcement materials adapted to the creation of composite parts. More specifically, the invention concerns a new intermediate material for fabricating composite parts, by subsequent injection or infusion of thermosetting resin, a fabrication process for composite parts from a stack of such a material, as well as the obtained composite parts.

The fabrication of composite parts or goods, that is, those containing one or several reinforcements or fibrous layers on one hand, and on the other hand, a primarily thermosetting matrix ("resin") that could include thermoplastics, can for instance be achieved by a process called "direct" or "LCM" (from the English "Liquid Composite Moulding"). A direct process is defined by the fact that one or more fibrous reinforcements are prepared in a "dry" state (that is without the final matrix), the resin or matrix being prepared separately, for instance by injection into the mold containing the fibrous reinforcements ("RTM" process, from the English "Resin Transfer Moulding"), by infusion through the thickness of the fibrous reinforcements ("LRI" process, from the English "Liquid Resin Infusion" or "RFI", from the English "Resin Film Infusion"), or alternatively by manual coating/impregnation by roller or brush on each unit layer of fibrous reinforcement, applied successively on the mold.

Other methods called indirect use pre-impregnated materials which already contain a sufficient proportion of resin for the formation of the desired composite part. Such materials are notably described in the documents US 2005/048280, WO 92/20521 and EP 0 554 950.

For the RTM, LRI or RFI processes, it is generally first necessary to build a fibrous preform of the mold of the desired finished product, then to impregnate this preform with a resin. The resin is injected or infused by differential pressure at temperature, then once all the amount of necessary resin is contained in the preform, the assembly is brought to a higher temperature to complete the polymerization/reticulation cycle and thus harden it.

The composite parts used in the automobile, aviation or naval industry, are particularly subject to very strict requirements, notably in term of their mechanical properties. It is therefore particularly important to use materials that on one hand are highly consistent, and on the other are easy to handle and process.

In these sectors, a large number of preforms are created from reinforcement materials, primarily carbon fibers, notably unidirectional ones. In order to meet the high standards of quality and productivity required notably by the aviation sector, it is increasingly necessary to implement automation processes. There is therefore a demand for unidirectional materials with a regular structure and notably little width variation, so as to avoid as much as possible material gaps ("gap" in English) or overlaps ("overlap" in English) of two adjacent reinforcements in draping or automatic deposition.

Prior art presents unidirectional layers of reinforcement strands in which the cohesion among strands is assured by thermoplastic bonding strands or glass/thermoplastic woven or unwoven fabrics that stretch transversally to the reinforcement strands. Such layers are for instance sold as PW-BUD by SIGMATEX UK Limited, Runcom Cheshire WA7 1TE, United Kingdom.

On these ribbons, the bond between strands is limited only to point bonding, the reinforcement fibers being free between the bonding strands. As a result, there exist large variations in width, notably between the bonding strands, creating standard variations in width that range from 0.40 to 1.00 mm.

Moreover, when such unidirectional layers are cut parallel to the direction of the reinforcement strands (conventionally called the 0° axis) to obtain a desired width, the cut edges are not sharp and are frayed by fragments of filament. These cut fibers are generally very inconvenient for subsequent processes, such as the creation of wads, material windings on coils (called "rings").

Thus, the invention aims to provide a process for achieving unidirectional layers with a highly consistent given width, adapted to direct processes for producing composite parts from one or more strands, while limiting material losses.

Another objective of the invention is to provide a process for producing unidirectional layers with no fibers cut along their main direction.

In this respect, the invention aims to provide a process for preparing a ribbon of reinforcement strands or filaments associated on each of its faces with a polymeric binder, said ribbon having a given width substantially constant over its entire length, in which the strands or filaments extend in a direction parallel to the length of the ribbon, characterized in that it comprises the following steps:

a) adjustment of the ribbon width to the desired width thanks to dimensioning devices, b) association of the ribbon on each of its faces to a polymeric binder to ensure a homogeneous cohesion of the ribbon, so that the total weight of the binder is less than 15% of the total weight of the obtained ribbon.

The polymer binder is, for example, a powder of one or more thermoplastic and/or thermosetting polymers or a nonwoven fabric of one or more thermoplastic and/or thermosetting polymers. The use of a nonwoven on both sides of the ribbon is particularly preferred.

When the polymeric binder is a nonwoven or fabric of thermosetting or preferably thermoplastic fibers as polymeric binder, it will be advantageously associated with the ribbon after adjusting the ribbon's width, so as to maintain the width obtained after adjustment. It is thus possible to size the ribbon to the desired width, which is essentially constant over its entire length, and to freeze the dimension obtained by associating the ribbon of fibers with the polymeric binder by adhesion, thus minimizing the width variations.

According to one implementation variant, the ribbon of fibers is associated on each of its faces to a nonwoven or fabric with a width greater than the width of the ribbon, and the nonwoven material or fabric is hot cut at each edge of the ribbon. Such a process makes it possible in particular to obtain a sharp edge without fraying, since the cut is not made on a strand, but along the edge of a strand and outside the strand. Additionally, the nonwoven is heated during cutting, until at least a partial fusion of the polymeric binder is achieved. Once cooled, the polymer will then make it possible to maintain the dimensioning of the ribbon. Ideally, notably when the overflow of the nonwoven or fabric beyond the edge of the ribbon is sufficient for cutting, and when the cutting is not performed too close to the edge of the ribbon, the two binders positioned on each of the faces of the ribbon are bonded so as to essentially encapsulate the ribbon of strands or filaments inside a binder envelope.

As part of this last variant, so as to further promote the achievement of a sharp edge and a good control of the ribbon width, the ribbon on one hand, and the portions cut from each of its edges, on the other hand, are extracted by means such as feed rollers or suction.

The process according to the invention, makes it possible to create given widths of materials from a single reinforcement strand or from several reinforcement strands extending along a direction parallel to the length of the material.

In the context of the invention, ribbons of essentially constant width are obtained, that is, ribbons that exhibit a very small variation of width over their entire length. Length is taken to mean a minimum of approximately a hundred meters. Ribbon or strip is taken to mean a layer of material with a length much greater than its width. In general, the ribbons prepared according to the process of the invention have a very great length, notably able to match the lengths of strands available on the market. Thanks to the process according to the invention, the width of the ribbon over its entire length will have a standard deviation notably less than 0.25 mm, preferably 0.22 mm and preferentially less than or equal to 0.20 mm. The width of the ribbons and the standard deviation can be determined according to the method described in the result examples of Table 3. The standard deviation can be defined as the root mean square of the deviations from the mean, as in:

$$\sqrt{\frac{1}{n}\sum_i (x_i - \bar{x})^2}$$

where:
n=number of values
xi=one value
x̄=arithmetic mean

Due to their essentially constant width, the ribbons according to the invention also exhibit very little variation of surface density.

The process according to the invention can be implemented to fabricate ribbons, each from a single strand (corresponding to an assembly of filaments), as well as to fabricate ribbons, each from several strands.

It is equally possible to implement the process according to the invention so as to create several ribbons simultaneously.

The invention is also aimed at a ribbon of reinforcement strands or filaments associated on each of its faces with a polymeric binder in which the strands or filaments extend in a direction parallel to the length of the ribbon, characterized in that said ribbon has a given width essentially constant over all its length and a standard deviation notably less than 0.25 mm, preferably less than 0.22 mm and preferentially less than or equal to 0.20 mm.

The invention is also aimed at ribbons that can be obtained according to the different variants of the process as defined above and in what follows.

Various other characteristics emerge from the description below referring to the appended drawings.

The process according to the invention makes it possible to dimension and control the width of unidirectional fiber ribbons and to set the size of the ribbons by associating unidirectional reinforcement fibers with a polymeric binder assuring a homogeneous bond. Such ribbons can notably present widths of 3 to 600 mm and can thus be obtained from one or several strands, a strand being composed of an assembly of filaments. Narrower ribbons can even be obtained when one or more very fine 1K or 3K strands are used.

Figure 1:
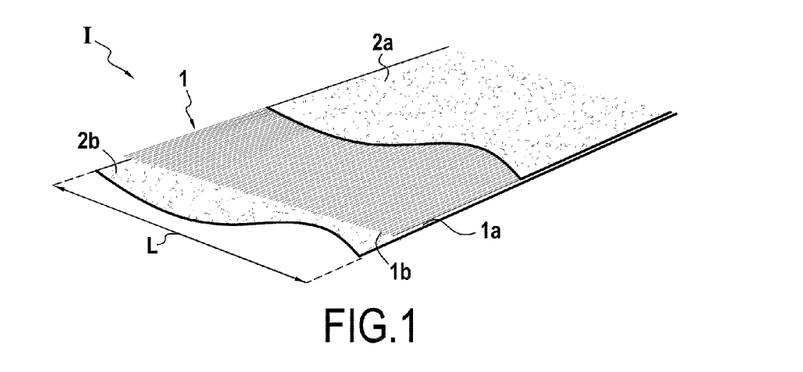
FIGS. 1 and 2 are, respectively, perspective cutaway and cross-section drawings of a ribbon obtained in the context of the invention, for the case of a unidirectional layer associated with two nonwoven materials.
Figure 2:
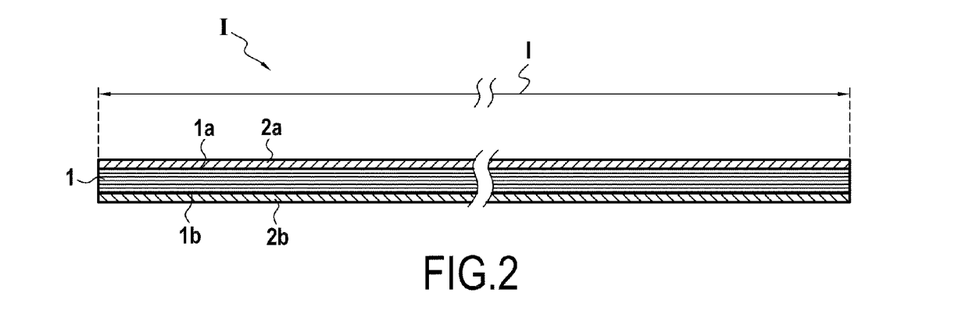
Figure 3:
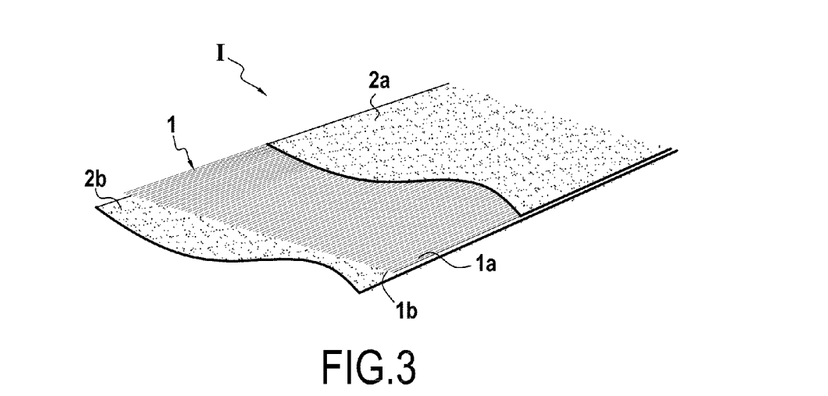
FIG. 3 is a view from above of a ribbon obtained in the context of the invention, for the case of a unidirectional layer associated with a powder on each of its faces.

As shown in FIG. 1, the ribbons I fabricated in the context of the invention have a length I and a width L. These ribbons consist of an assembly of filaments (case of a single strand 1) or of an assembly of strands 1 (each composed of an assembly of filaments) which extends parallel to the width of the ribbon. A ribbon has a generally rectangular shape and is associated on each of its large faces 1a and 1b to a polymeric binder, as shown in FIG. 2. FIGS. 1 and 2 illustrate the case where the polymeric binders are two nonwovens 2a and 2b, and FIG. 3 the case where the polymeric binder is a powder 3 distributed over the two faces of the ribbon I.

The reinforcement filaments or fibers will be positioned so as to assure a quasi-total coverage over the entire surface of the ribbon. In particular, when the ribbon consists of a unidirectional layer of several strands, the latter will be positioned edge to edge. When the total width of the unidirectional layer is adjusted to be constant with a minimum standard deviation of the width before the creation of the ribbon, the layer width is adjusted by minimizing, and even avoiding any gap ("gap" in English) or overlap ("overlap" in English) in the material.

A strand is generally composed of an assembly of strands or filaments and in general, in the case of carbon strands contains 1,000 to 80,000 filaments, and advantageously 12,000 to 24,000 filaments. The reinforcement strands used in the context of the invention are preferably a material selected among carbon, ceramics, glasses, silicas, basalts or aramids, or any other material used in the field of composite materials, with the fibers being natural or synthetic. Carbon is nonetheless particularly preferred. The usable ceramics are notably silicon carbide and refractory oxides, such as alumina and zirconia. Particularly preferred for use in the context of the invention are 1 to 24 K, and preferentially 12 and 24K carbon strands. The constituting fibers are preferably continuous. The generally used strands have an essentially circular transversal cross-section (qualified as round strands) or, preferably, are essentially parallelepipedic or elliptical (qualified as flat strands). These strands have a certain width and thickness. As an example, a flat 3K and 200 tex carbon strand generally has a width of 1 to 3 mm, a flat 12K and 446 tex carbon strand has a width of 2 to 5 mm, a 12K and 800 tex flat strand has a width of 3 to 7 mm, a 24K and 1600 tex flat carbon strand has a width of 5 to 12 mm, and a 24K and 1040 tex flat carbon strand has a width of 5 to 10 mm. A flat carbon strand of 3,000 to 24,000 filaments will therefore most often have a width of 1 to 12 mm. Notable among the carbon strands are the High Resistance (HR) strands whose tensile modulus is between 220 and 241 GPa and whose stress rupture is between 3450 and 4830 MPa, the Intermediate Modulus strands (IM) whose tensile modulus is between 290 and 297 GPa and whose tensile stress rupture is between 3450 and 6200 MPa, and the High Modulus strands (HM) whose tensile modulus is between 345 and 448 GPa and whose tensile stress rupture is between 3450 and 5520 Pa (from "ASM Handbook", ISBN 0-87170-703-9, ASM International 2001).

Figure 6:
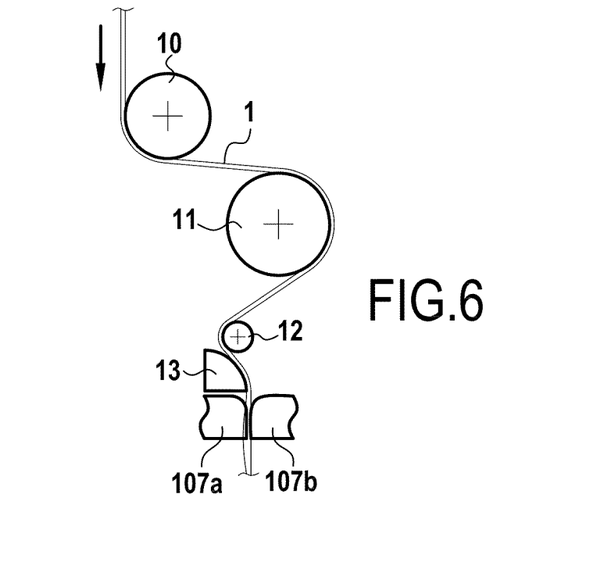
FIG. 6 schematically represents a strand or an assembly of strands moving through the spreading and dimensioning devices.

The ribbon is fabricated from one or several strands. In case a ribbon consists of several strands, it is the assembly of the strands (and not each individual strand) that will be dimensioned to produce a layer of a given width. The strand or strands can be drawn from a spool and can be spread before the dimensioning stage. To this end, the strand or strands can enter a spreading device, composed for instance of one or several spreading bars 12, as illustrated in FIG. 6. This spreading step may be necessary, depending on the desired weight per unit area and also to obtain, before dimensioning, a width for the layer or for the strands larger than the width desired after dimensioning. This dimensioning system may be complemented by a bar 12 vibrating along its length, located at the exit of bars 10 and 11, just ahead of the dimensioning device 13, as illustrated in FIG. 6. Similarly, such a device could be complemented by several vibrating bars similar to bar 12 when the association of high count strands is used for very low surface densities.

Figure 7:
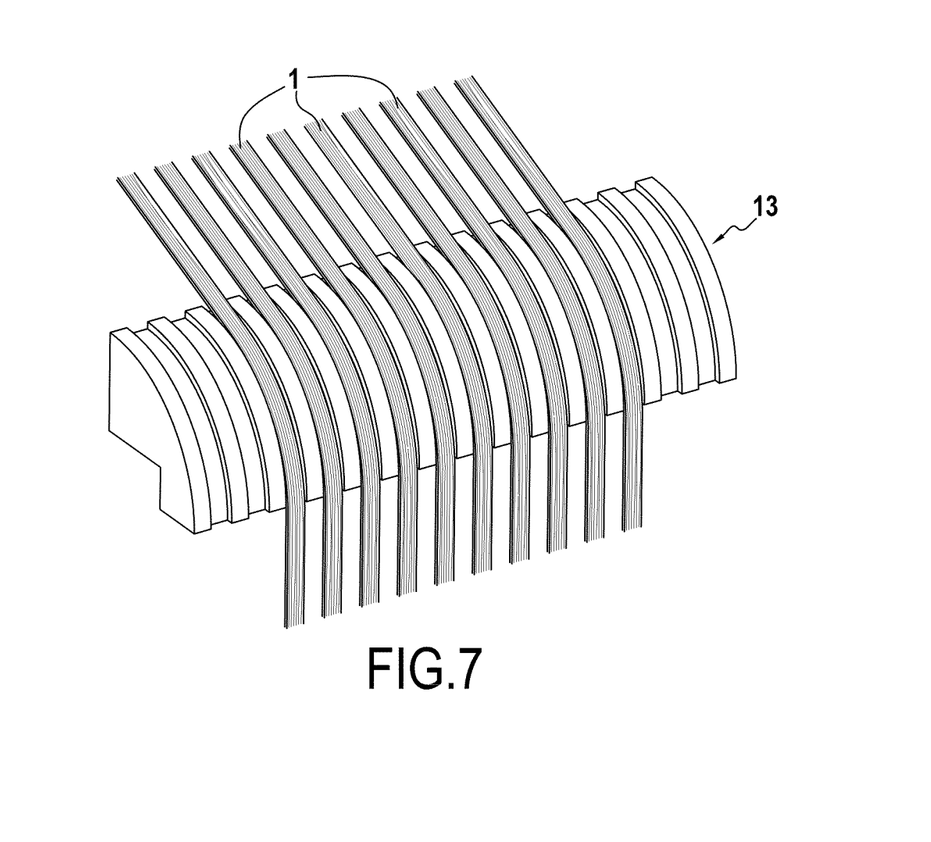
FIG. 7 represents item D of FIG. 3 which corresponds to the dimensioning element before association with the polymeric binder, for the case where several ribbons based on a single strand are fabricated simultaneously.

The dimensioning stage is performed by passing the layer or the strand over dimensioning devices, which can be an opening of a given width, notably in the form of a flat-bottomed groove cut into a roller, or of an opening between two teeth in the case of a single ribbon based on one or several strands, or of a dimensioning comb defining dimensioning openings for several strands, as illustrated in FIG. 7, in the case of several ribbons fabricated in parallel. When creating a layer composed of several strands, in reality and strictly speaking, the dimensioning of the layer width is performed only on the two external strands, the other strands being guided by a comb located ahead of the spreading unit, such that no free space exists between the strands inside the layer.

At the exit of the dimensioning device, the dimensioned unidirectional layer will have over its entire length, a quasi-constant width that it will retain throughout the process until the final ribbon is obtained. Preferably, at the exit of the dimensioning device, the width of the dimensioned unidirectional layer will have over the entire length of the unidirectional layer, a standard deviation notably less than 0.25 mm, preferably below 0.24 mm and preferentially less than or equal to 0.20 mm. In case the ribbon of unidirectional fibers is associated on each of its faces to a powder, the dimensioning can occur before and/or after the association with the powder. In case the polymeric binder is a fabric or a nonwoven, the dimensioning will occur before its association with the unidirectional ribbon.

Also, in case the polymeric binder is a fabric or a nonwoven, notably a thermoplastic material, the obtained dimensioned unidirectional layer at the exit of the dimensioning device, is associated on each of its faces with a thermoplastic fabric or nonwoven, for instance on a conveyor belt driven by rollers. The distance between the exit of the dimensioning device and the device that associates the layer with the polymeric binder (conveyor belts in the illustrated example) will preferably be very small, of the order of a few millimeters, so as to retain the obtained dimensioning. To enable their bond with the strands or filaments after cooling, the nonwovens are subjected to a heating stage ahead of their association with the ribbon, causing the polymer to soften, and even melt. The width of the nonwoven is chosen so that it will spread beyond both sides of the unidirectional layer. The heating and pressure conditions will be adapted to the material composing the nonwovens and to their thickness. Most often, a stage of thermocompression will be performed at a temperature in the range of $T_{f\,nonwoven}-15°$ C. and $T_{f\,nonwoven}+60°$ C. (with $T_{f\,nonwoven}$ designating the melting temperature of the nonwoven material) and under a pressure of 0.1 to 0.6 MPa. It is thus possible to achieve compression ratios of 1 to 10 for the nonwoven before and after association. The lamination stage of nonwoven materials on the carbon unidirectional material is equally decisive for correctly controlling the final thickness of the intermediate product. Indeed, depending on temperature and pressure conditions, notably during the lamination, it is possible to modify and therefore to adjust the thickness of the nonwoven on each side of the intermediate product.

The thickness of the nonwovens before their association with the unidirectional layer will be selected depending on the manner in which they will be associated with the unidirectional fiber layer. Most often, their thickness will be very close to the desired thickness of the ribbon. It can also be possible to select the use of a thicker nonwoven which will be laminated under temperature during the association stage so as to reach the desired thickness. In a preferred manner, the unidirectional fiber layer is associated on each of its large faces to two essentially identical nonwovens so as to obtain a perfectly symmetrical intermediate product. The thickness of the nonwoven before association with the unidirectional layer varies between 0.5 and 200 μm, and preferably between 10 and 170 μm. On the intermediate product according to the invention, the thickness of each nonwoven is in the range of 0.5 to 50 microns, and preferably in the range of 3 to 35 microns. The thickness of the different nonwovens before association is determined by the standard NF EN ISO 9073-2 by using the method A with a test area of 2827 mm$^2$ (60 mm diameter disc) and an applied pressure of 0.5 kPa.

The ribbon is then pulled from the conveyor belt by means of a feed roller (three draw rollers) and is subjected to a cut along each of its longitudinal edges using a hot cutting device and heated knives in particular. The cut is not made in a strand, but just next to the edge of the strand, so as to avoid any fraying. The hot cutting of the nonwoven at each edge of the ribbon, causes a certain contraction in the latter.

Figure 4:
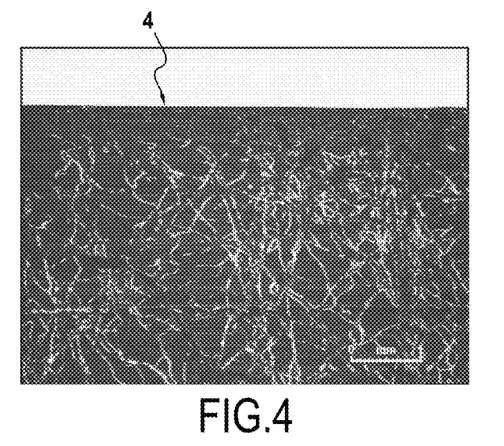
FIG. 4 is a photograph of a ribbon obtained in the context of the invention, illustrating its very clean edge.

Because the two nonwovens are wider than the width of the unidirectional layer, they show spot adhesion to each other, preferentially trapping the unidirectional layer at the carbon edges. The obtained ribbon thus has a very clean edge 4, without fragments of cut filaments, as shown in FIG. 4.

The ribbon is then pulled by three draw rollers. II is equally possible to even further facilitate the creation of a very clean edge by removing the scraps of nonwovens by means of feed rollers or by means of suction.

Figure 5:
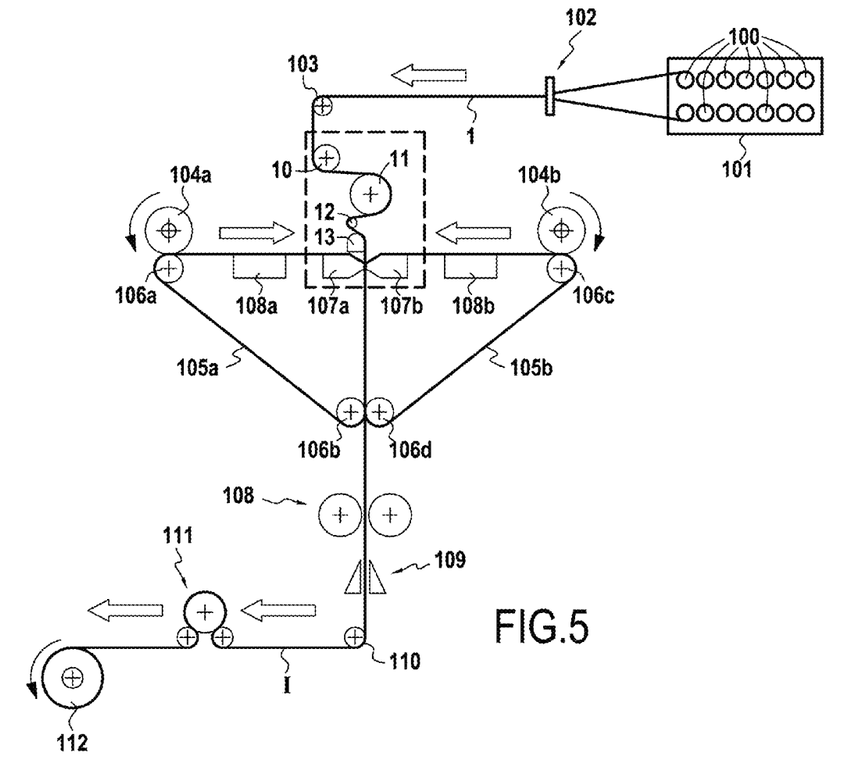
FIG. 5 schematically represents an overview of a device to fabricate a ribbon associated on each of its large faces with a nonwoven material.

FIG. 5 shows a simplified schematic of a device enabling the fabrication of a ribbon according to the invention, using a unidirectional layer of strands, notably of carbon, associated on each of its large faces to a nonwoven, notably a thermoplastic material.

The carbon strand or strands 1 are unwound from carbon spools 100 mounted on a creel 101, passed through a comb 102, and directed into the axis of the machine by a guide roller 103. The carbon strands are then spread with a heating bar 11 and spreading bar 12 then dimensioned with the dimensioning device to obtain a unidirectional layer with the desired width. The rolls of nonwovens 104a and 104b are unwound without tension and transported by conveyor belts 105a and 105b mounted between the free-rotation rollers 106a, 106b, 106c, 106d and the heated bars 107a, 107b. The nonwovens 2a and 2b are preheated in zones 108a and 108b before coming into contact with the carbon strands 1 and laminated on each side of the two heated bars 107a and 107b whose air gap is controlled. A coolable calender 108 next applies pressure on the unidirectional layer with nonwoven material on each side, the layer then being directed toward the cutting device 109. A return roller 110 makes it possible to redirect the ribbon I toward the traction system consisting of three draw rollers 111 followed by a winding roller 112 to form a roll consisting of the ribbon I.

Figure 8:
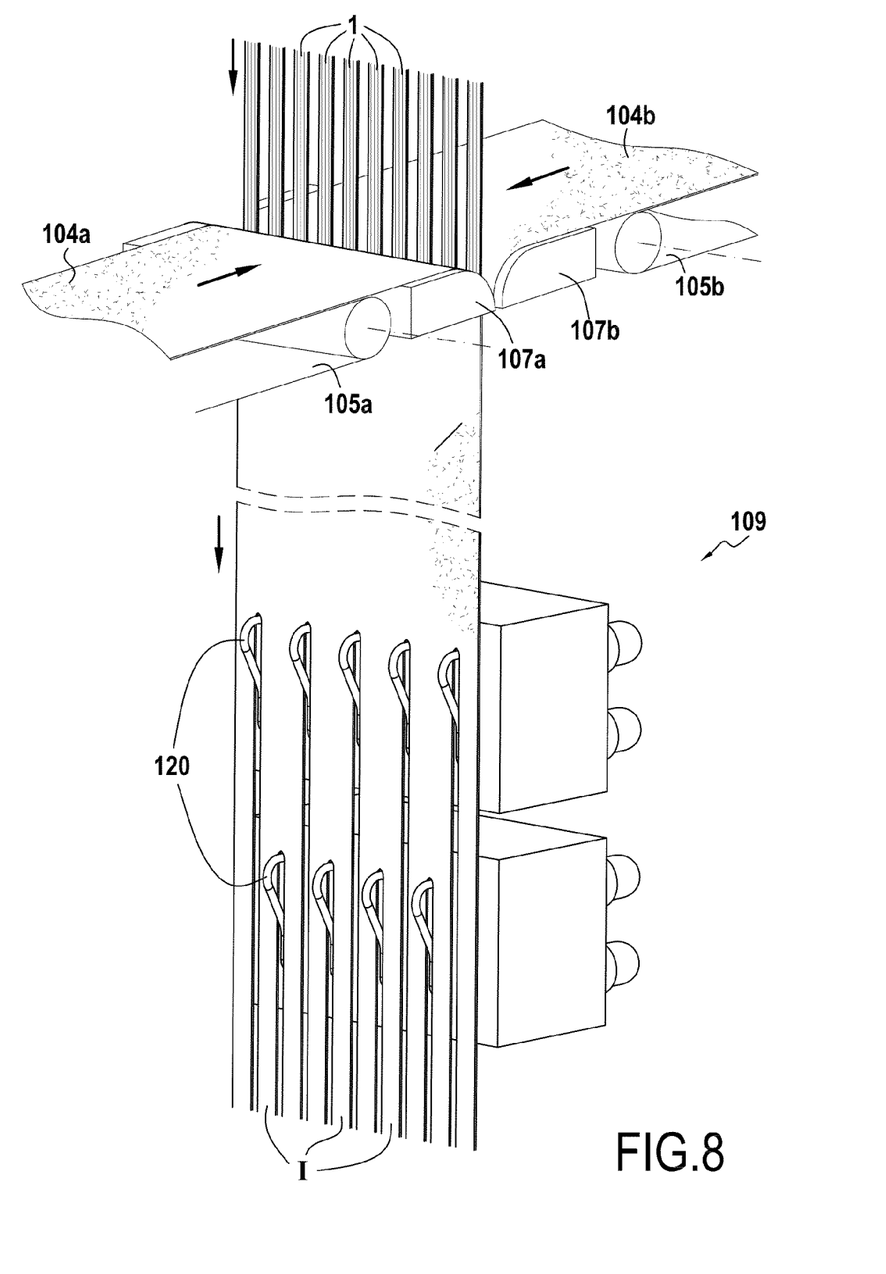
FIG. 8 represents a partial view of the cutting device for the case where several ribbons are fabricated in parallel.

It is equally possible to produce several ribbons simultaneously, in which case each strand or assembly of strands constituting a ribbon will be spread if necessary and dimensioned individually, and the different ribbons will be placed spaced from each other, leaving sufficient space between each strand, so as to enable the cutting. A single nonwoven covering the strands and the spaces will then be associated with all the ribbons on each of their faces, as illustrated in FIG. 8. Cutting can then be preferentially performed between each ribbon, without creating scraps of nonwoven material between the cuts, using a device such as shown in FIG. 8, and several (two in the illustrated example) lines of cutting devices 120, parallel, spaced and offset by the width of a ribbon.

To further facilitate the production of a clean edge and good control of the width of the ribbon, the portions cut away on both sides of its edges are removed by means of feed rollers or by suction. In this case, the extremities corresponding to the scraps contain a strand whose nonwoven can be cut only on one side, which will facilitate the removal of the scraps by feed rollers or by suction. It would also be possible to place on the edges intended to be cut and play the role of scraps, a strand of a different nature than those used to create the ribbons. This applies both to the creation of a single ribbon, as well as to the case of several ribbons created in parallel.

The width of the ribbon or ribbons created in this manner can be controlled by an optical measurement system before storage. According to such a continuous process, the unidirectional fiber ribbons can be produced in very long lengths. Because of their flexibility, the ribbons can be wound immediately, to be stored as rolls when they leave the production line. These spools can have flanges in the manner of movie spools, or in an advanced application, are wound directly on cylindrical spools at the output of the machine like the spools of carbon strands delivered by vendors.

In case the ribbon is covered on each of its faces by thermoplastic or thermosetting powder, it is not useful to perform any cutting. The ribbon can be dimensioned by the dimensioning device described above, before and/or after associating the ribbon with the powder.

According to a preferred implementation method, a preferentially heated dimensioned ribbon will be associated with powder on each of its faces, notably by a pass through an electrostatic powdering enclosure. Cooling will then be advantageously achieved by maintaining the previously obtained dimensioning, and again transferring the powder-bearing ribbon to a dimensioning device such as described earlier. This device, such as a circular comb shown in FIG. 7, with one or several passes depending on the number of ribbons obtained, makes it possible for the ribbon to maintain its constant width during the application of the powder and its cooling.

The process according to the invention concerns the fabrication of dimensioned strands or unidirectional sheets of dry fibers, that is, intended for processes called "direct". Also, the weight of the polymeric binder is less than 15% of the total weight of the ribbon, and preferably 0.1 to 10%, and advantageously 3 to 10% of the total weight of the ribbon.

In the context of the invention, the use of powder or nonwoven binders that provide a random and isotropic cover will be preferred, thus making it possible to assure a uniform cohesion in all directions, unlike the fabrication of spaced strands. The bond between the polymeric binder and unidirectional ribbon is achieved by heating, using the hot tackiness nature of the polymeric binder, followed by cooling. The use of nonwovens, which offer ease of handling and a coherent nature before their association with the fibers is particularly preferred.

For instance, the polymeric binder can be a thermoplastic material selected among polyamides (PA: PA6, PA12, PA11, PA6.6, PA 6.10, PA 6.12, . . . ), copolyamides (CoPA), ether or ester block polyamides (PEBAX, PEBA), polyphthalamide (PPA), polyesters (polyethylene terephthalate—PET-, polybutylene terephthalate—PBT— . . . ), copolyesters (CoPE), thermoplastic polyurethanes (TPU), polyacetals (POM . . . ), polyolefins (PP, HDPE, LDPE, LLDPE . . . ), polyethersulfones (PES), polysulfones (PSU . . . ), polyphenylene sulfones (PPSU . . . ), polyetheretherketones (PEEK), polyetherketoneketones (PEKK), poly(phenylene sulfide) (PPS), polyetherimides (PEI), thermoplastic polyimides, liquid crystal polymers (LCP), phenoxys, block copolymers such as styrene-butadiene-methylmethacrylate copolymers (SBM), methylmethacrylate-acrylate of butyl-methylmethacrylate copolymers (MAM) and their mixtures.

The polymeric binder can also be thermosetting, such as epoxies, unsaturated polyesters, vinylesters, polyurethanes, phenolics, polyimides, bismaleimides, or a thermoplastic/thermosetting mixture.

In case the polymeric binder is in the form of a nonwoven, a thermoplastic fiber nonwoven is preferably used, of a material mentioned above or of a mixture of fibers of different thermoplastic materials mentioned above. Notably, a usable thermoplastic fiber nonwoven material can be the nonwovens sold for instance by the companies Protechnic (66, rue des Fabriques, 68702—CERNAY Cedex—France) or Spunfab Ltd./Keuchel Associates, Inc. (175 Muffin Lane Cuyahoga Falls, Ohio 44223, USA). Such nonwoven materials, also named veils, can be composed of continuous or short fibers. In particular, the fibers composing the nonwoven will have average diameters of 0.5 and 70 μm (before association with the unidirectional layer). In the case of a short fiber nonwoven, the fibers will have a length of 1 to 100 mm for example.

The ribbons of unidirectional fibers according to the invention can be used to create aviation parts that require high mechanical performances, and notably to create primary parts, for instance for the fuselage, wing panels, or any other complex part, such as fan blades. Such parts can be fabricated by any known direct process, such as resin infusion or injection.

The examples below illustrate the invention, but have no limiting nature.

The carbon strands AS7 J and GS 12K and IMA GS 12K are sold by the company HEXCEL Corporation, Stamford, Conn. USA.

The 3 g/m² copolyamide nonwoven material 1R8D03 is sold by the company Protechnic.

As a reference, the width of non-dimensioned unidirectional layers (208 strands for a surface density of 321 g/m², 158 strands for a surface density of 250 g/m², and 78 strands for a surface density of 125 g/m²) and not associated with a polymeric binder other than a transversal hot-melt strand every 50 mm, was measured over a length of 500 m, with a manual measurement every 5 m. The results obtained are shown in Table 1 below.

TABLE 1

| AS7 J 12K | Average width (mm) | Standard deviation (mm) |
|---|---|---|
| 321 g/m² | 519 | 1.1 |
| 250 g/m² | 506 | 1.8 |
| 125 g/m² | 499 | 0.3 |

The standard deviation appears to vary between 0.3 and 1.8 mm.

The process according to the invention was then implemented [translator's note: incomplete sentence in original] A machine such as shown in FIG. 5 was used. The catalog number of the heated cutting devices is: Thermocut TC-1 of the company LOEPFE BROTHER, LIMITED, Wetzikon, Switzerland.

The operating conditions are shown in Table 2.

TABLE 2

| Nonwoven | Fiber | Carbon surface density (g/m²) | Width (mm) | Line speed (m/min) | T° Bar 11 (° C.) | T° Bar 13 (° C.) | T° 108a & 108b (° C.) | T° 107a & 107b (° C.) |
|---|---|---|---|---|---|---|---|---|
| 1R8D03 | AS7J 12K | 126 | 6.21 | 2.5 | 170 | 100 | 110 | 230 |
|  | AS7 GS 12K | 252 | 25.4 | 2 | 200 | 200 | 110 | 240 |
|  | IMA GS 12K | 210 193 | 6.35 64.7 460 | 1.3 | 200 | 200 | 120 | 140 |

The characteristics of the ribbons obtained are presented in Table 3.

The mean and standard deviation of the width were measured with the following device: the ribbon is unwound from its support at a constant speed of 1.2 m per minute, with a constant tension between 200 and 400 cN, and then, without support at that position, brought at a distance of 265 mm before a camera model Baumer Optronic Type FWX 20, focal length 20 mm, 1624×1236 pixels (Baumer Optronic Gmbh, Germany). The camera settings are: 1 pixel is equal to 0.05 mm, which is equivalent to a photo size of 1640 pixels×0.05=82 mm. A photo is then taken every 38 mm over a minimum length of 50 m, corresponding to a minimum of 1315 width measurements.

The program NEUROCHECK 5.1 (Neurocheck Gmbh, Germany) then analyzes the image and stores the width values in a file to be statistically processed by the program MINITAB (Minitab Inc, USA).

TABLE 3

|  |  | Average width (mm) | Standard deviation (mm) |
|---|---|---|---|
| AS7J 12K | 126 g/m² 252 g/m² | 6.21 25.4 mm | 0.18 0.12 |
| IMA GS 12K | 210 g/m² 193 g/m² | 6.35 64.7 460 | 0.18 0.12 0.21 |

The standard deviation appears to vary between 0.12 and 0.21 mm and does not depend on the width of the ribbon.

Figure 9A:
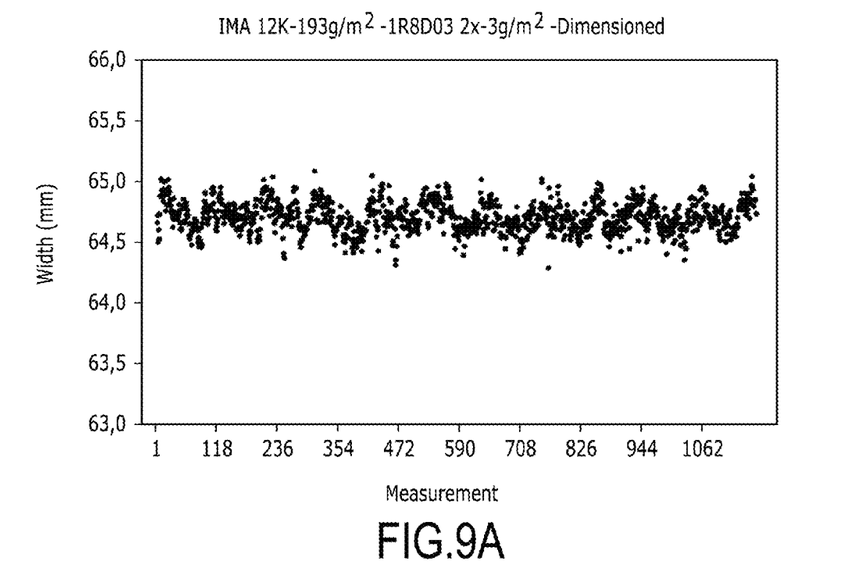
FIGS. 9A, 9B and 10 compare the mean width and the standard deviation obtained with on one hand, a ribbon according to the invention associating a unidirectional layer of 193 g/m$^2$ (obtained with 28 strands of IMA GS 12 K and 446 tex with a width of 64.7 mm) with two nonwovens, and on the other hand, a ribbon produced with the same strands, but without dimensioning, and the same two nonwovens.
Figure 9B:
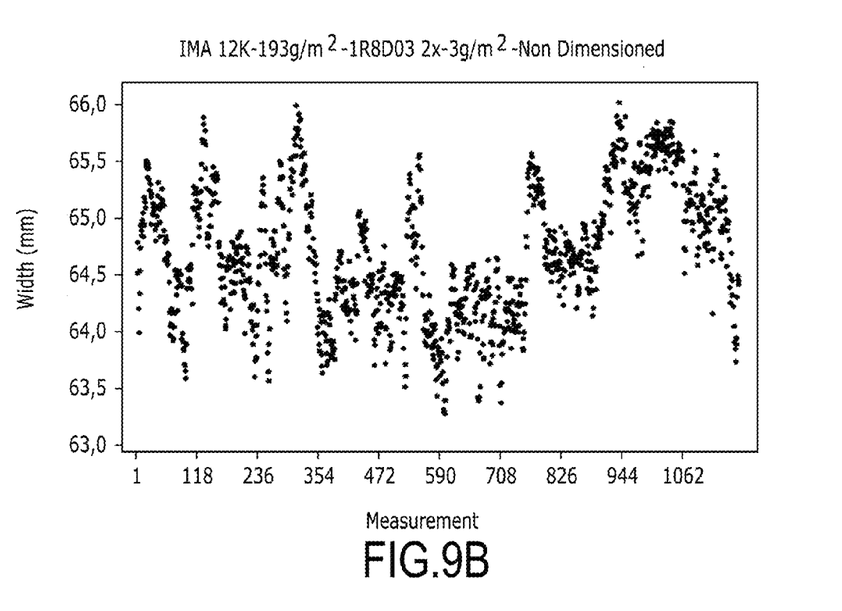
Figure 10:
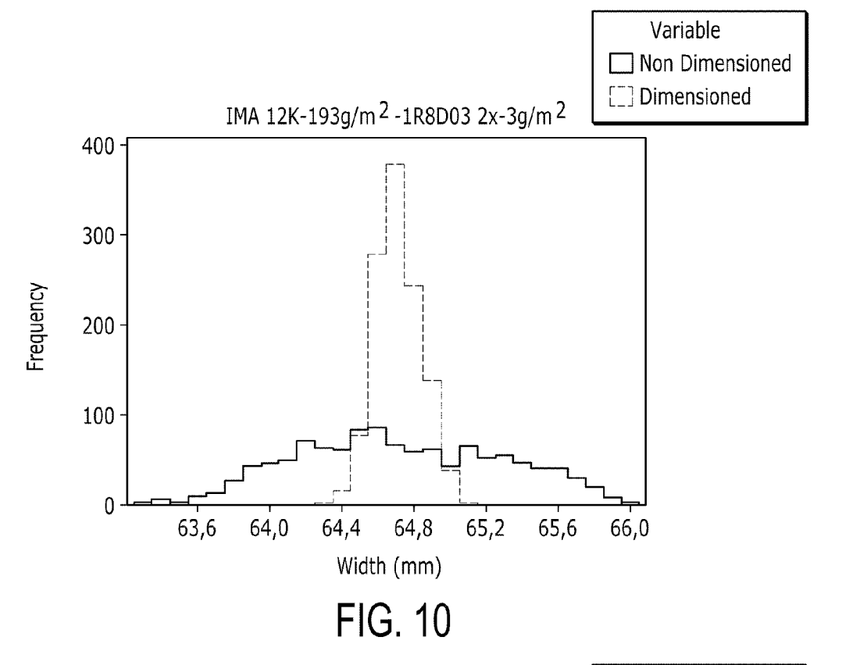

FIGS. 9A, 9B and 10 compare the mean width and the standard deviation of a 193 g/m² ribbon according to the invention (obtained with 28 strands of 446 tex IMA GS 12 K with a width of 64.7 mm), with a ribbon produced from the same strands, but without dimensioning and with the same nonwovens. In the case of the ribbon according to the invention, the standard deviation obtained is 0.12 mm, while without dimensioning the standard deviation is 0.57 mm.

Figure 11:
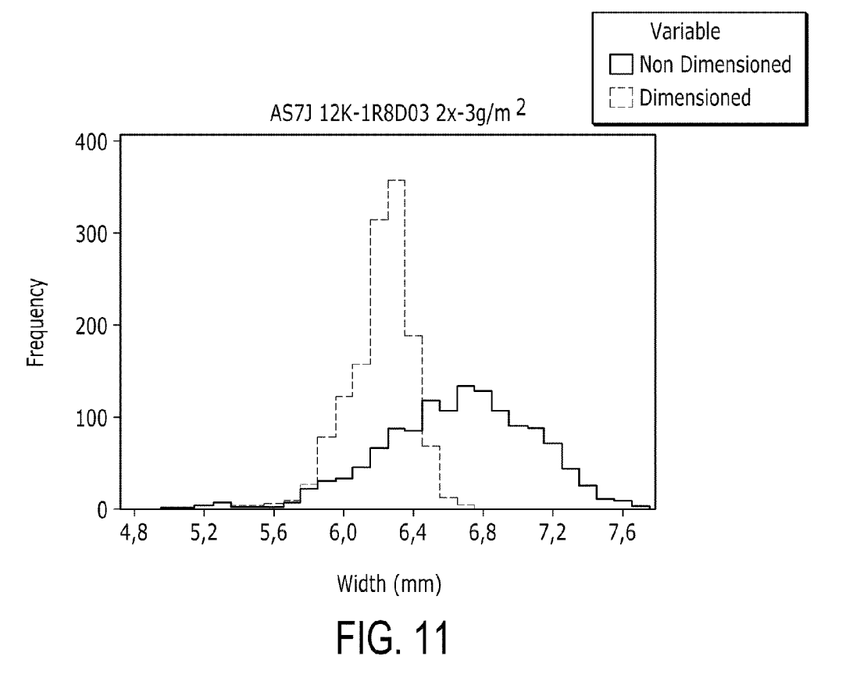
FIGS. 11, 12A and 12B compare on one hand, a ribbon according to the invention associating a unidirectional layer of 126 g/m$^2$ (obtained with 1 strand of 785 tex AS7JK 12K with a mean width of 6.21 mm) with two nonwovens, and on the other hand a ribbon obtained with the same strand but without dimensioning and the same two nonwovens.
Figure 12A:
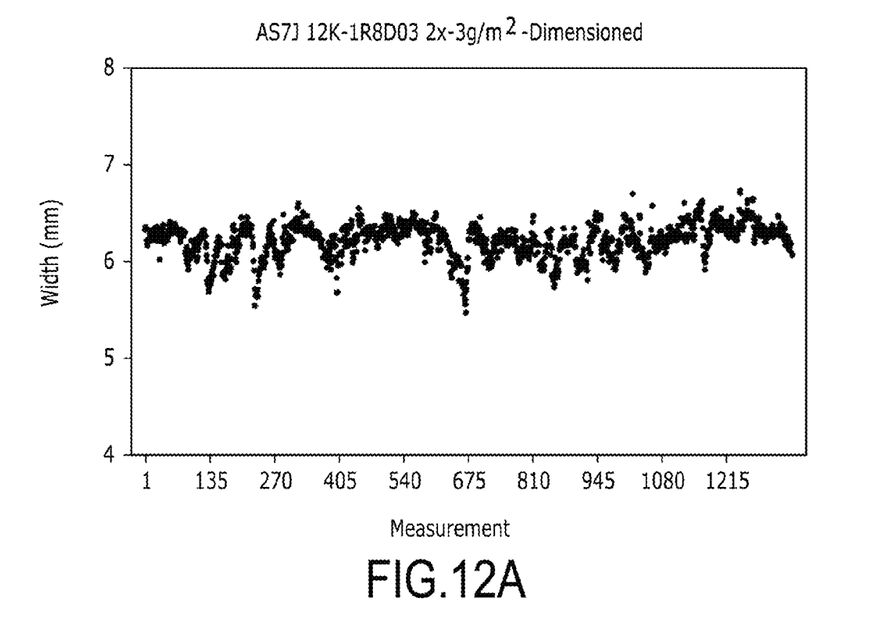
Figure 12B:
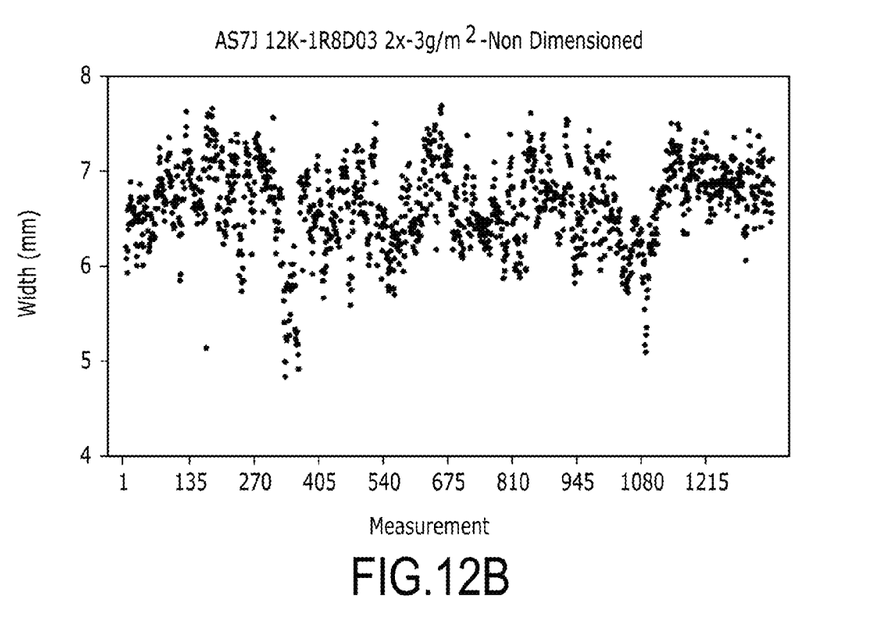

FIGS. 11, 12A and 12B compare a ribbon according to the invention associating a unidirectional sheet of 126 g/m² (created with 1 strand of 785 tex AS7JK 12K over a mean width of 6.21 mm) and two nonwovens, with a ribbon created with the same strand but without dimensioning and with the same two nonwovens. In the case of the ribbon according to the invention, the standard deviation obtained is 0.18 mm, while without dimensioning, the standard deviation is 0.44 mm.

The process according to the invention has also been implemented to create a ribbon with powder on each of its faces. A machine described below was used under the operating conditions described in Table 4. The machine includes:

spreading devices 10, 11 and 12 and a sizing device 13 as shown in FIGS. 6 and 7, at the exit of the dimensioning device 13 in the form of a circular comb, the unidirectional sheets of strands are brought into an electrostatic powdering enclosure, in which an electrostatic gun is positioned at a distance d from the strands, forming an angle a with the latter, at the exit of the powdering enclosure, the powder is secured on the strands with short infrared radiation, the ribbons then pass over a new circular comb as shown in FIG. 7, then over a simple bar before being air cooled.

The powder used is an epoxy resin containing a hardener (7 P160, from the company Akzo Nobel). The electrostatic gun is model OPTIGUN OA02 of the brand GEMA (ITW GEMA GmbH, Switzerland). The agitator is operated only during powdering so as to avoid amalgamation of the powder.

TABLE 4

| Powder weight ratio (%) | Fiber | Carbon surface density (g/m$^2$) | Width (mm) | Strand speed (m/min) |
|---|---|---|---|---|
| 9 | AS7J 12K | 304 | 2.58 | 50 |

| T° Bar 201 (° C.) | Short infrared radiation power (W) | Distance of short infrared radiation from strand (mm) | Electrostatic gun distance from strand - d (mm) | Angle of gun with respect to strand - α (°) |
|---|---|---|---|---|
| 220 | 500 | 40 | 100 | 38 |

| Air input pressure (bars) | Power (kV) | Total air flow (m3/h) | Powder amount (%) | Electrode cleaning airflow (m3/h) |
|---|---|---|---|---|
| 5 | 70 | 5 | 10 | 1.4 |

The characteristics of the obtained ribbon are shown in Table 5.

TABLE 5

| | | Average width (mm) | Standard deviation (mm) |
|---|---|---|---|
| AS7J 12K | 304 g/m$^2$ | 2.58 | 0.12 |

Figure 13:
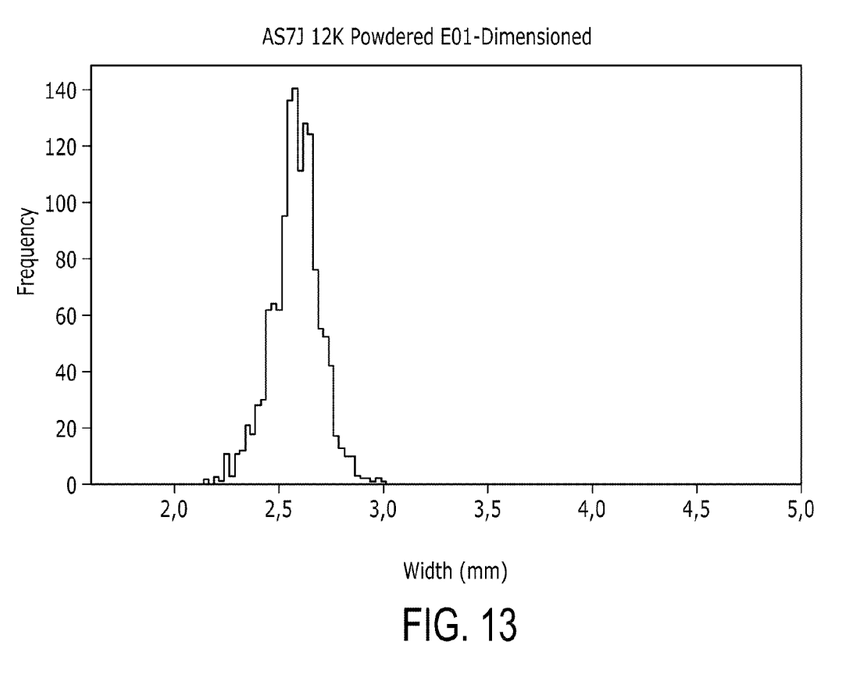
FIG. 13 shows the width distribution of a ribbon according to the invention associating a unidirectional layer of 304 g/m$^2$ (obtained with 1 strand of 785 tex AS7JK 12K over a mean width of 2.58 mm) with powder.

FIG. 13 shows the width distribution of the ribbon according to the invention, associating a unidirectional sheet of 304 g/m2 (created with 1 strand of 785 tex AS7JK 12K with a width average of 2.58 mm) and powder. The standard deviation obtained is 0.12 mm, while it is 0.44 mm without dimensioning.

The invention claimed is:

1. A process for preparing an intermediate material for use in fabricating composite parts by injection or infusion of thermosetting resin into said intermediate material, said process comprising the steps of:
   a) providing a dimensioned ribbon which is free of thermosetting resin, said dimensioned ribbon having first and second faces that extend between edges of said dimensioned ribbon, said dimensioned ribbon comprising unidirectional reinforcement strands or filaments that extend in a direction parallel to the edges of said dimensioned ribbon, said dimensioned ribbon having a width between said edges of from 3 millimeters to 600 millimeters and a length, wherein the standard deviation of said dimensioned ribbon width over the entire length of said dimensioned ribbon is less than 0.25 millimeters;
   b) providing a first layer of nonwoven material or fabric material, said first layer of nonwoven material or fabric material comprising thermoplastic fibers, said first layer of nonwoven material or fabric material having a thickness and a width;
   c) providing a second layer of nonwoven material or fabric material, said second layer of nonwoven material or fabric material comprising thermoplastic fibers, said second layer of nonwoven material or fabric material having a thickness and a width;
   d) heating said first and second layers of nonwoven material or fabric material to a sufficient temperature to soften said thermoplastic fibers to form a softened first layer comprising softened thermoplastic fibers and a softened second layer comprising softened thermoplastic fibers, said softened first layer and said softened second layer each having a thickness;
   e) bonding said softened first layer to the first face of said dimensioned ribbon and bonding said softened second layer to the second face of said dimensioned ribbon, said bonding comprising the steps of pressing said first and second softened layers against the dimensioned ribbon with a pressure that is sufficient to reduce the thickness of said softened first and second layers such that the thickness of said softened first layer is less than the thickness of said first layer of nonwoven material or fabric material and the thickness of said softened second layer is less than the thickness of said second layer of nonwoven material or fabric material and wherein said softened first and second layers extend outward past the edges of said dimensioned ribbon to form softened overflow areas which consist of said softened first layer directly bonded to said softened second layer, said bonding step further including cooling said softened first layer and said softened second layer to form cooled overflow areas which extend along each edge of said dimensioned ribbon; and
   f) cutting said softened or cooled overflow areas along said edges without cutting into the unidirectional reinforcement strands or filaments in order to form said intermediate material and maintain the standard deviation of said ribbon width at less than 0.25 millimeters over the entire length of said intermediate material wherein the total weight of the first and second thermoplastic layers is less than 15% of the total weight of the intermediate material and wherein the cut edges of said cooled overflow areas forms the edges of said intermediate material.

2. A process according to claim 1 that includes the additional step of forming said dimensioned ribbon from an non-dimensioned ribbon comprising unidirectional reinforcement strands or filaments that extend in a direction parallel to the length of said non-dimensioned ribbon, said non-dimensioned ribbon having a length and edges that define a non-dimensioned ribbon width of from 3 millimeters to 600 millimeters, wherein the standard deviation of said non-dimensioned ribbon width over the entire length of said non-dimensioned ribbon is greater than 0.30 millimeters.

3. A process according to claim 1 wherein the standard deviation of the width of said dimensioned ribbon over the entire length thereof is less than or equal to 0.20 mm.

4. A process according to claim 1 wherein the dimensioned ribbon comprises a single strand that comprises an assembly of filaments.

5. A process according to claim 4 wherein said assembly of filaments comprises carbon filaments.

6. A process according to claim 5 wherein said single strand comprises from 12,000 to 24,000 carbon filaments.

7. A process according to claim 5 wherein said first and second layers are nonwoven material comprising a veil of nonwoven thermoplastic fibers composed of polyamide or copolyamide or combinations thereof.

8. A process according to claim 1 wherein the dimensioned ribbon comprises several strands.

9. A process according to claim 1 comprising the steps of:
a) providing a second dimensioned ribbon which is free of thermosetting resin, said second dimensioned ribbon having first and second faces that extend between edges of said second dimensioned ribbon, said second dimensioned ribbon comprising unidirectional reinforcement strands or filaments that extend in a direction parallel to the edges of said second dimensioned ribbon, said second dimensioned ribbon having a width between said edges of from 3 millimeters to 600 millimeters and a length, wherein the standard deviation of said dimensioned ribbon width over the entire length of said second dimensioned ribbon is less than 0.25 millimeters;
b) orienting said second dimensioned ribbon parallel to said dimensioned ribbon so that the first edge of said second dimensioned ribbon and the second edge of said dimensioned ribbon are spaced apart to provide a cutting space between said first dimensioned ribbon and said second dimensioned ribbon; and
c) bonding said softened first layer to the first face of said second dimensioned ribbon and bonding said softened second layer to the second face of said second dimensioned ribbon at the same time said softened first and second layers are bonded to said dimensioned ribbon wherein said softened or cooled overflow area along the second edge of said dimensioned ribbon fills said cutting space.

10. A process according to claim 1 wherein said strands or filaments are selected from the group consisting of carbon fibers, glass fibers, aramid fibers, silica fibers, ceramic fibers and mixtures thereof.

11. A process according to claim 1 wherein said first and second layers are nonwoven material comprising nonwoven thermoplastic fibers.

12. A process according to claim 11 wherein said nonwoven material comprises a veil of thermoplastic fibers.

13. A process according to claim 12 wherein said veil of thermoplastic fibers comprises polyamide fibers or copolyamide fibers or combinations thereof.

14. A process according to claim 1 wherein said cutting is accomplished by hot cutting said softened or cooled overflow areas.

15. A process according to claim 1 wherein said thermoplastic fibers are polyamide fibers or copolyamide fibers or combinations thereof.

16. A process according to claim 1 wherein each of said first and second layers of nonwoven material or fabric material has a thickness of between 10 microns and 170 microns.

17. A process according to claim 16 wherein each of said first and second softened layers has a thickness of between 3 microns and 35 microns.

18. A process according to claim 1 wherein the temperature to which said first and second layers of nonwoven material or fabric material is heated is from 15° C. below the melting temperature of said thermoplastic fibers to 60° C. above the melting temperature of said nonwoven thermoplastic fibers.

19. A process according to claim 18 wherein said pressing of said first and second softened layers against the dimensioned ribbon is conducted under a pressure of 0.1 to 0.6 MPa.

20. A process according to claim 1 wherein said pressing of said first and second softened layers against the dimensioned ribbon is conducted under a pressure of 0.1 to 0.6 MPa.

* * * * *